US010039375B2

(12) United States Patent
Newsome

(10) Patent No.: US 10,039,375 B2
(45) Date of Patent: Aug. 7, 2018

(54) MOUNT FOR ATTACHING ELECTRONIC DEVICES TO A GUITAR STAND

(71) Applicant: Reggie Wayne Newsome, Midlothian, VA (US)

(72) Inventor: Reggie Wayne Newsome, Midlothian, VA (US)

( * ) Notice: Subject to any disclaimer, the term of this patent is extended or adjusted under 35 U.S.C. 154(b) by 0 days.

(21) Appl. No.: 15/435,107

(22) Filed: Feb. 16, 2017

(65) Prior Publication Data

US 2017/0231381 A1 Aug. 17, 2017

Related U.S. Application Data

(60) Provisional application No. 62/389,023, filed on Feb. 16, 2016.

(51) Int. Cl.

*A47B 19/10* (2006.01)
*G10G 7/00* (2006.01)
*G10G 5/00* (2006.01)
*F16B 2/06* (2006.01)

(52) U.S. Cl.

CPC .............. *A47B 19/10* (2013.01); *F16B 2/065* (2013.01); *G10G 5/00* (2013.01); *G10G 7/00* (2013.01)

(58) Field of Classification Search

CPC .. A47B 19/10; G10G 7/00; G10G 5/00; F16B 2/065
USPC ........................... 248/441.1, 443, 444, 447.2
See application file for complete search history.

(56) References Cited

U.S. PATENT DOCUMENTS

| | | | | | |
|---|---|---|---|---|---|
| 160,044 | A * | 2/1875 | Wilson | A47B 23/042 | 248/447.2 |
| 741,894 | A * | 10/1903 | Durham | A47B 23/042 | 248/207 |
| 936,936 | A * | 10/1909 | Phelps | A47B 19/06 | 211/37 |
| 1,281,682 | A * | 10/1918 | Southworth | A47B 19/06 | 101/382.1 |
| 1,300,045 | A * | 4/1919 | Tavi | A47B 23/042 | 248/447.2 |
| 4,568,052 | A * | 2/1986 | Solomon | B41J 29/15 | 248/281.11 |
| 4,987,690 | A * | 1/1991 | Aaldenberg | B41J 29/15 | 248/281.11 |
| 5,312,082 | A * | 5/1994 | Chang | B42F 9/001 | 248/441.1 |
| 5,709,365 | A * | 1/1998 | Howard | A47B 23/025 | 248/447.2 |
| 6,536,720 | B1 * | 3/2003 | Yu | A47B 19/002 | 248/122.1 |

(Continued)

*Primary Examiner* — Muhammad Ijaz

(57) ABSTRACT

A mount that is used to attach electronic devices to a guitar stand is made of a back panel, a clamping mechanism, a support beam and a multi-position fastener. The clamping mechanism is a user-actuated clamp that uses a fixed jaw and a movable jaw to hold electronic devices against the back panel. The back panel, which is a rigid plate, is connected to the fixed jaw to further support the clamped electronic device. Additionally, the fixed jaw of the clamping mechanism is mounted onto one end of the rigid support beam. This enables the mount for electronic devices is capable of being attached to various other pieces of musical equipment or stage equipment. Additionally, the multi-position fastener is affixed to a second end of the support beam, opposite to the fixed jaw.

19 Claims, 9 Drawing Sheets

(56) References Cited

U.S. PATENT DOCUMENTS

| | | | | |
|---|---|---|---|---|
| 7,080,814 | B1 * | 7/2006 | Brooks | A45C 13/385<br>248/441.1 |
| 9,695,849 | B2 * | 7/2017 | Zhou | F16M 11/041 |
| 2003/0019995 | A1 * | 1/2003 | Evanoff | A47B 19/002<br>248/441.1 |
| 2017/0231381 | A1 * | 8/2017 | Newsome | A47B 19/10<br>248/447.2 |

* cited by examiner

MOUNT FOR ATTACHING ELECTRONIC DEVICES TO A GUITAR STAND

The current application claims a priority to the U.S. Provisional Patent application Ser. No. 62/389,023 filed on Feb. 16, 2016.

FIELD OF THE INVENTION

The present invention relates generally to a music stand. More specifically, the present invention relates to a music stand with an adjustable fastening mechanism that enables the music stand to be attached to the neck of a guitar stand.

BACKGROUND OF THE INVENTION

Music stands can be made from a multitude of materials and come in various shapes and sizes. Despite these variables, every music stand is designed to accomplish the same task. That is, each music stand is designed to hold sheet music in a position that is easy to read. Despite being designed to serve this one singular purpose, the music stand is often used as a podium during speeches or as a display stand for placards and works of art. While quite useful, one drawback of traditional music stands is that they frequently require the use of a dedicate base. The base must be transported with the music stand. Thus, adding weight to a musician's luggage and reducing mobility. It is often the case that a guitar player will only have the ability to travel with a guitar stand. In such cases, the musician must hope that music stands will be provided at any musical engagement.

The present invention, addresses these concerns by providing a music stand that can be mounted onto various pieces of musical equipment including, but not limited to, guitar stands, piano stands, drum stands and microphone stands. To accomplish this, the present invention is a music stand that features an adjustable fastening mechanism can be attached to external devices. The present invention enables the musician to create an ad hoc music stand using any piece of musical or stage equipment. Thus, forgoing the need for a music stand with a dedicated base. In addition to functioning as a music stand, the present invention acts as a support for electronic devices, such as tablet computers, cell phones, and the like. Furthermore, these electronic devices are prevented from falling off the present invention by a clamping mechanism.

DETAIL DESCRIPTIONS OF THE INVENTION

All illustrations of the drawings are for the purpose of describing selected versions of the present invention and are not intended to limit the scope of the present invention.

Figure 1:
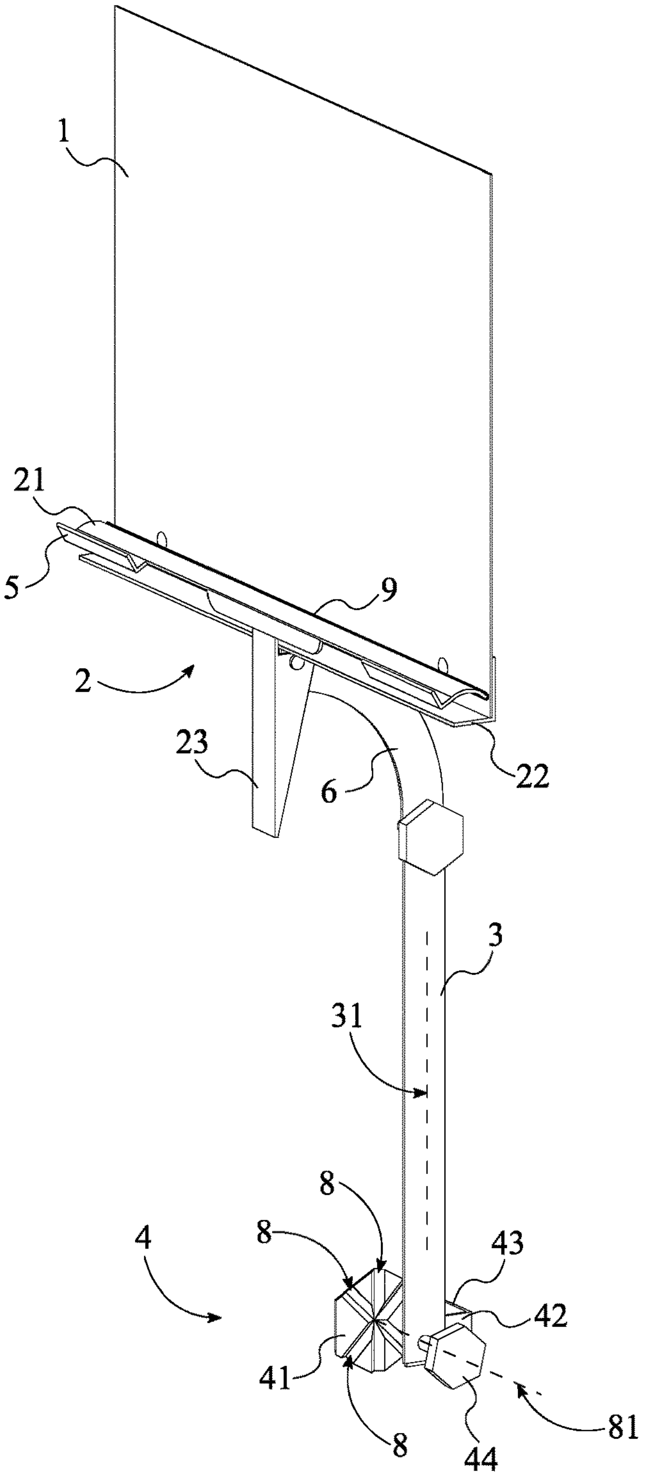
FIG. 1 is a perspective view of the present invention.
Figure 2:
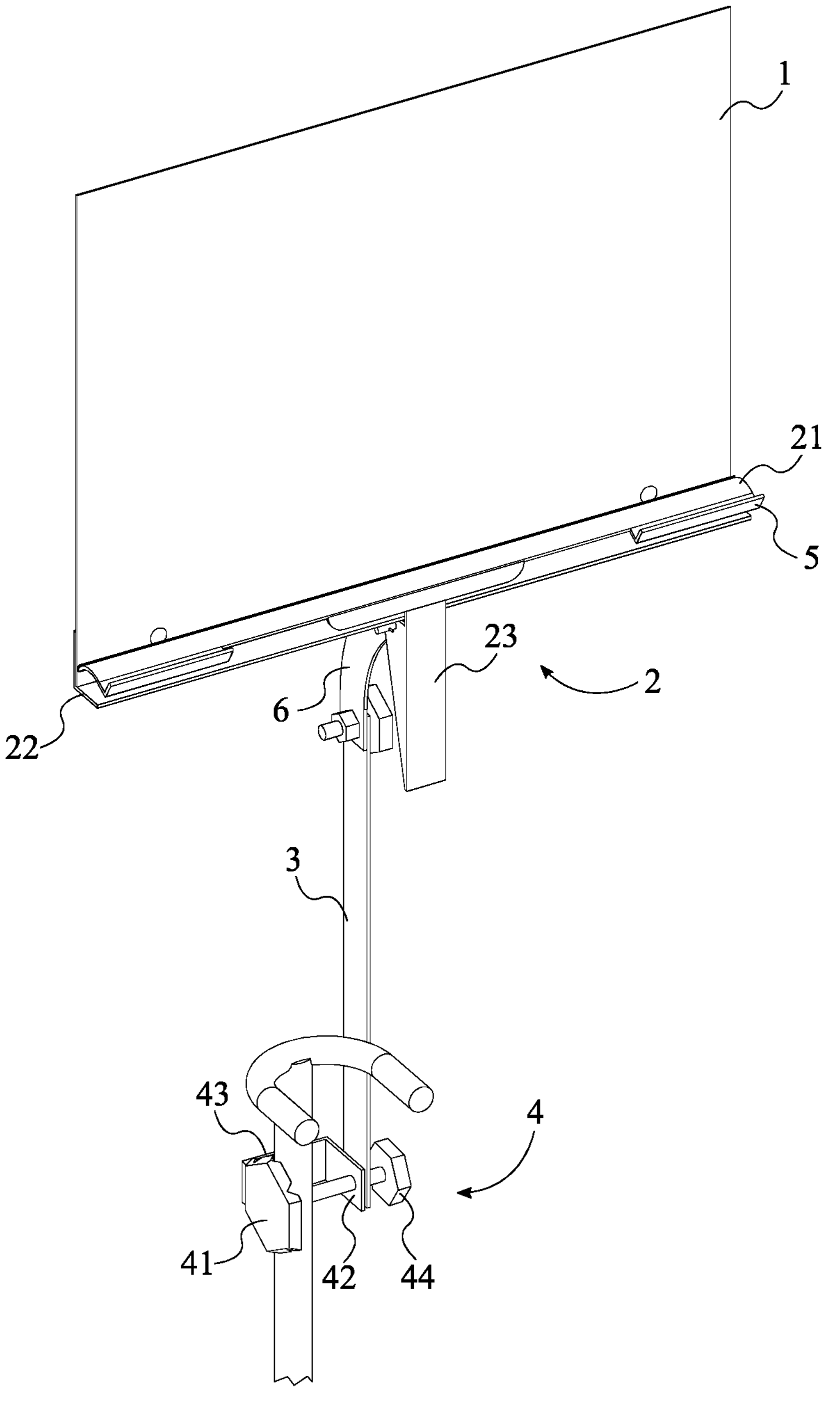
FIG. 2 is a perspective view of the present invention while attached to the neck of a guitar stand.

In reference to FIG. 1 and FIG. 2, the present invention, the mount for attaching electronic devices to a guitar stand, enables a user to affix a tablet computer onto a standard guitar stand. The term guitar stand is used herein to refer to items including, but not limited to, music stands, microphone stands, and marching band clips. To accomplish this, the present invention comprises a back panel 1, a clamping mechanism 2, a support beam 3, and a multi-position fastener 4. The back panel 1 is a rigid plate that is used to support the back of a tablet computer. The clamping mechanism 2 is a user operated clamp that retains the inserted tablet computer in a desired position until the clamping mechanism 2 is disengaged. Additionally, the clamping mechanism 2 comprises a movable jaw 21 and a fixed jaw 22. The fixed jaw 22 is a rigid component of the clamping mechanism 2 against which the movable jaw 21 is pressed. Furthermore, the fixed jaw 22 is adjacently connected to the back panel 1 so that the back panel 1 is able to easily support the tablet computer that is placed into the clamping mechanism 2. The movable jaw 21 is a rigid component of the clamping mechanism 2 that is actuated by the user and used to press the inserted tablet computer against the fixed jaw 22. To that end, the movable jaw 21 is operatively coupled to the fixed jaw 22, wherein the movable jaw 21 is used to press against the fixed jaw 22. Consequently, the movable jaw 21 and the fixed jaw 22 function as a user-actuated clamp.

The support beam 3 is a rigid bar that holds the clamping mechanism 2 in a position that is offset from the guitar stand to which the present invention is attached. This is possible because the fixed jaw 22 is terminally mounted onto the support beam 3. As a result, the fixed jaw 22 is maintained in a position that facilitates viewing the information displayed on the tablet computer inserted into the clamping mechanism 2. The multi-position fastener 4 is a user-actuated fastener that is used to attach the present invention to a guitar stand. Additionally, the multi-position fastener 4 is used to maintain the present invention one of many user-selected orientations, relative the attached guitar stand. To accomplish this, the multi-position fastener 4 is terminally mounted onto the support beam 3, opposite to the fixed jaw 22. Thus positioned, the user is able to attach the multi-position fastener 4 to the guitar stand in a manner that maintains the fixed jaw 22 in a desired position until the multi-position fastener 4 is detached from the guitar stand.

Figure 3:
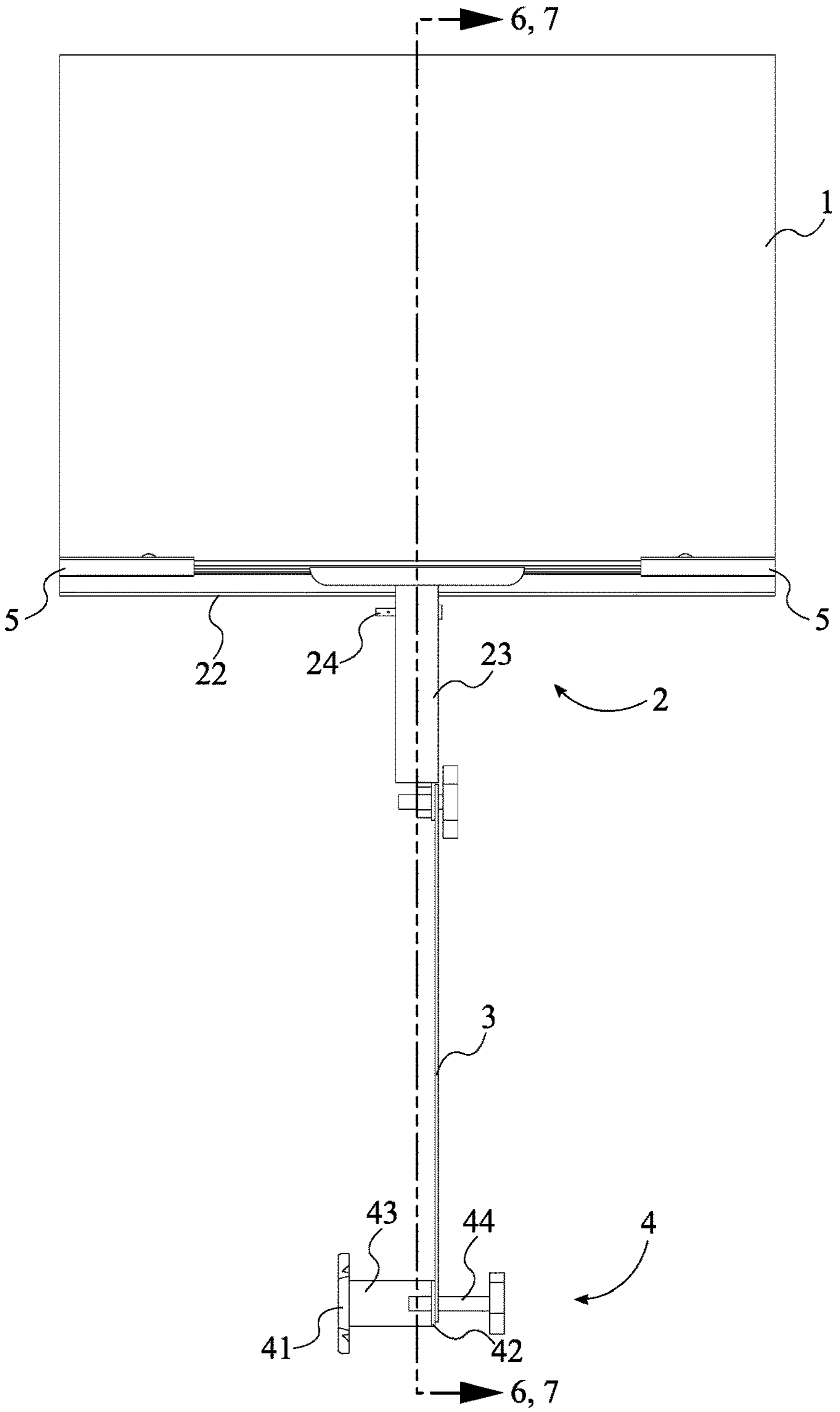
FIG. 3 is a front view of the present invention.
Figure 4:
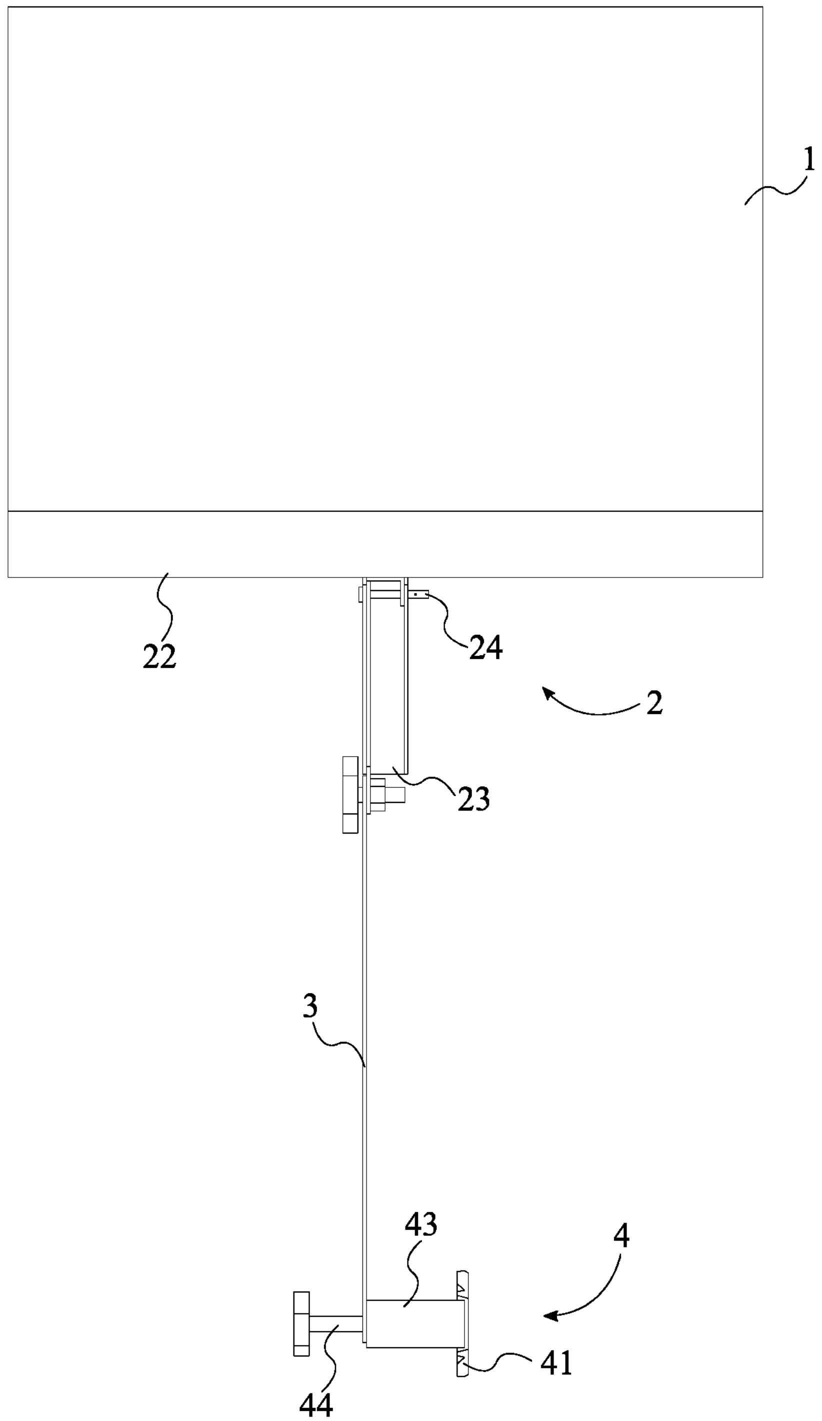
FIG. 4 is a rear view of the present invention.
Figure 7:
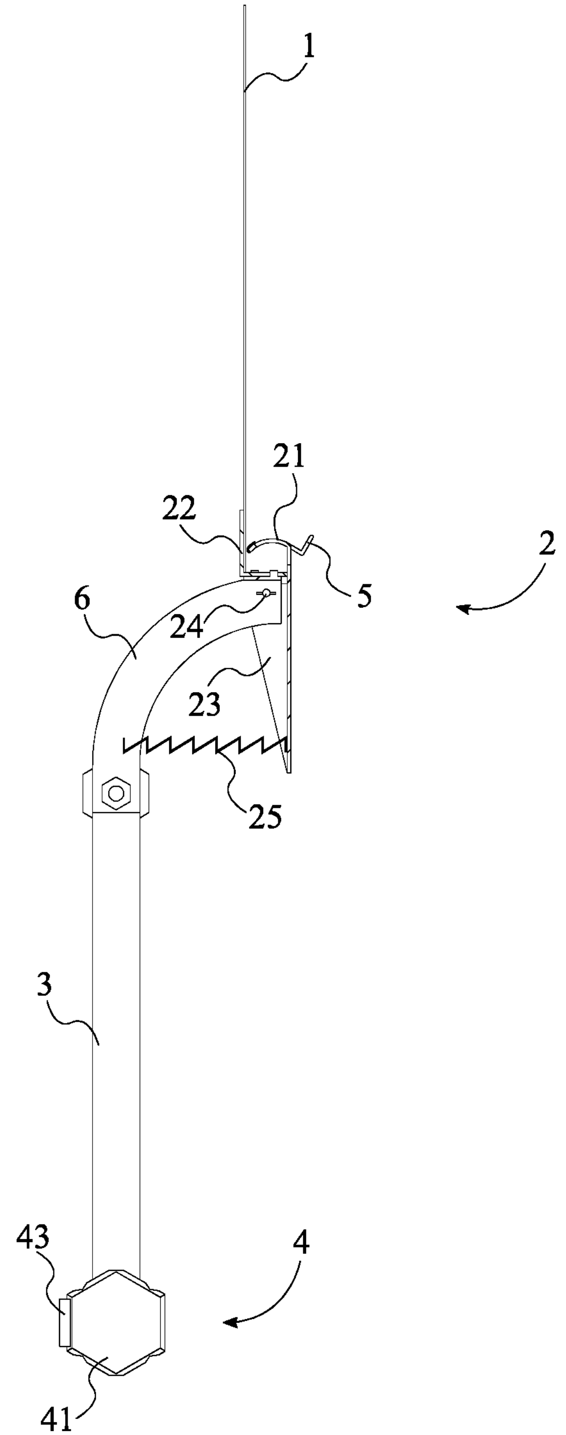
FIG. 7 is a cross-sectional view of a first alternative embodiment of the present invention taken along line 7 shown in FIG. 3, wherein this view shows the spring as a compression spring.

In reference to FIG. 1, FIG. 3, and FIG. 7, expounding upon the descriptions of the clamping mechanism 2, the clamping mechanism 2 further comprises a handle 23, a fulcrum 24, and a spring 25. The handle 23 is a rigid, and ergonomically shaped, component that can be easily grasped by the hand of the user. Additionally, the handle 23 is adjacently connected to the movable jaw 21. Accordingly, motion of the handle 23 is transferred to the movable jaw 21. The fulcrum 24 is a pivot point about which the moving components of the clamping mechanism 2 rotate. To that end, the handle 23 is connected to the fixed jaw 22 by the fulcrum 24 so that the handle 23 is able to pivot about the fulcrum 24 and move the movable jaw 21 closer to or away from the fixed jaw 22.

Figure 6:
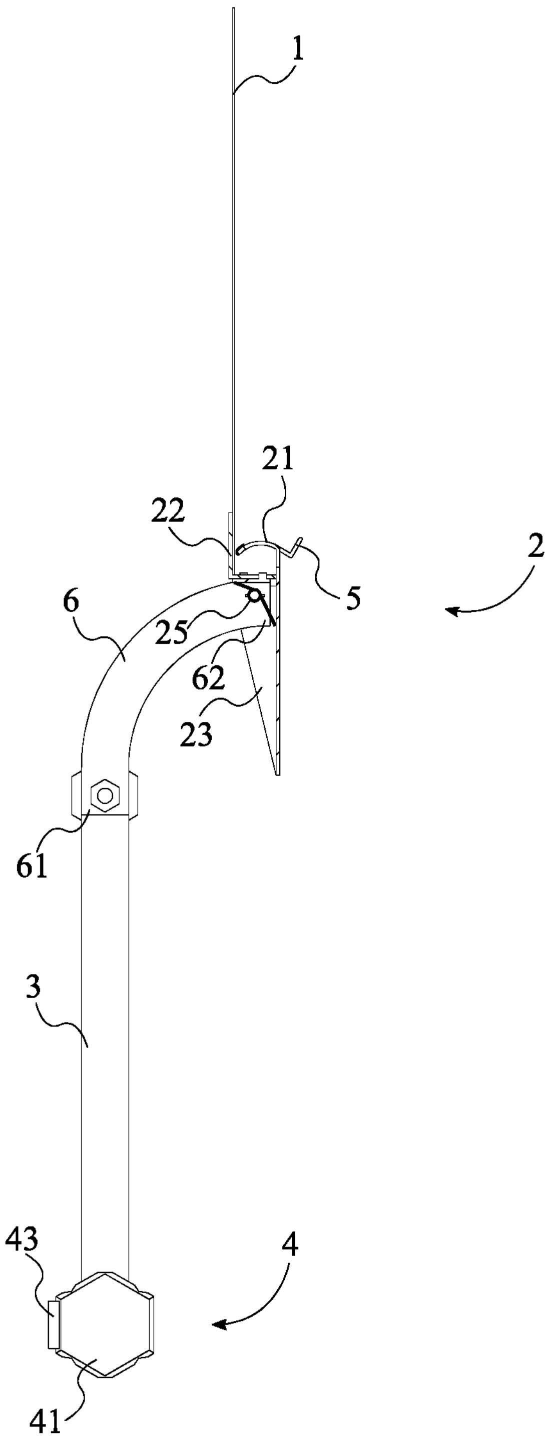
FIG. 6 is a cross-sectional view of the present invention taken along line 6 shown in FIG. 3.

In reference to FIG. 3, FIG. 6, and FIG. 7, the spring 25 is operatively coupled between the movable jaw 21 and the fixed jaw 22, wherein the spring 25 is used to retract the movable jaw 21 toward the fixed jaw 22. Consequently, the spring 25 applies a force to the handle 23 that causes the movable jaw 21 to press against the fixed jaw 22 when no external forces are applied. In the preferred embodiment of the present invention, the spring 25 is a torsion spring. In this embodiment, the torsion spring is mechanically integrated into the fulcrum 24, wherein the torsion spring is used to resist rotation of the movable jaw 21 away from the fixed jaw 22. As a result, the torsion spring pivots the handle 23 and the movable jaw 21 toward the fixed jaw 22 about the fulcrum 24. In a first alternative embodiment, the spring 25 is a compression spring. In this embodiment, the compression spring is operatively coupled between the handle 23 and the fixed jaw 22, wherein the compression spring is used to resist rotation of the movable jaw 21 away from the fixed jaw 22. Thus positioned, the compression spring becomes compressed when an externally applied force moves the handle 23 and the movable jaw 21 away from the fixed jaw 22. Furthermore, the compression spring expands and moves the handle 23 and the movable jaw 21 toward the fixed jaw 22, once the externally applied force is removed.

In reference to FIG. 1, in addition to a clamp for electronic devices, the present invention is designed to function as a music stand on which pages of traditional sheet music can be placed. To that end, the present invention further comprises at least one page-stabilizing tab 5. The at least one page-stabilizing tab 5 is a rigid protrusion that extends from the clamping mechanism 2. Furthermore, the at least one page-stabilizing tab 5 is adjacently connected to the movable jaw 21. Accordingly, the at least one page-stabilizing tab 5 is positioned in a location that facilitates supporting sheet music. The at least one page-stabilizing tab 5 is positioned offset from the back panel 1 so that the at least one page-stabilizing tab 5 does not impede the ability of the movable jaw 21 to press against the fixed jaw 22. Additionally, the at least one page-stabilizing tab 5 can be a plurality of page-stabilizing tabs that are distributed along the movable jaw 21. This distribution enables the plurality of page-stabilizing tabs to support the weight of a page or book that is placed onto the clamping mechanism 2.

Figure 5:
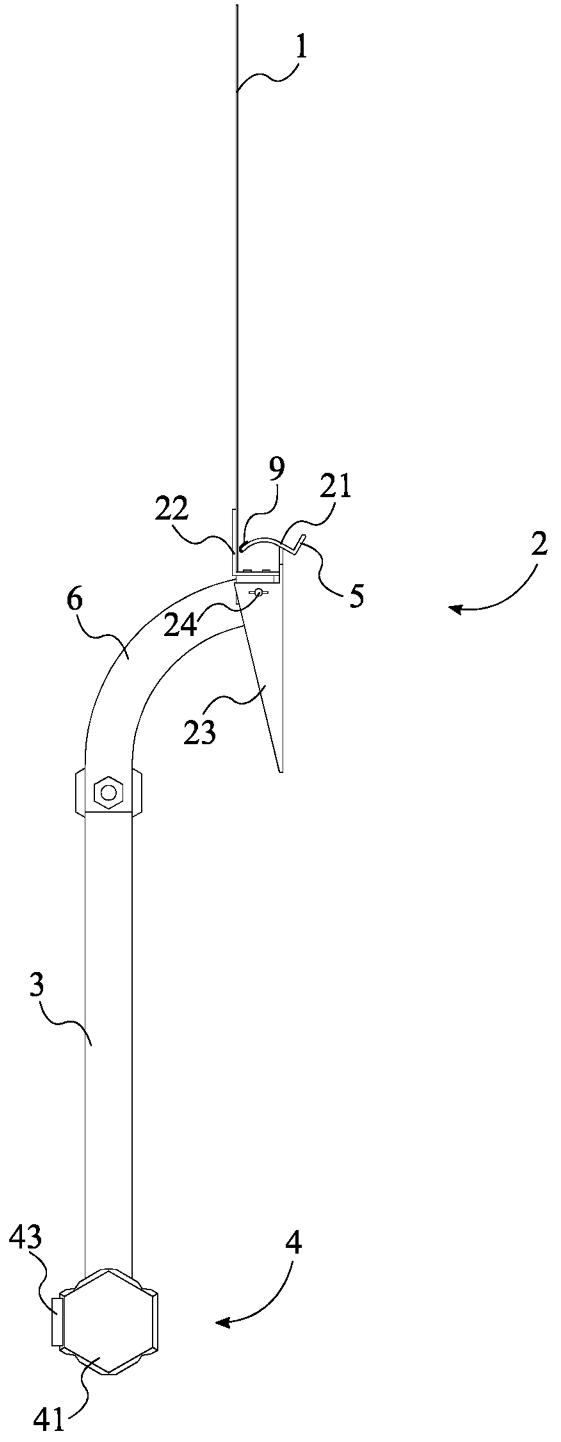
FIG. 5 is a left-side view of the present invention.

In reference to FIG. 5, the present invention further comprises a neck member 6 that is a rigid bar and used to mount the clamping mechanism 2 onto the support beam 3. The fixed jaw 22 is mounted onto a first end 61 of the neck member 6. As a result, the neck member 6 is able to maintain the clamping mechanism 2 and the back panel 1 in a desired position. Opposite the fixed jaw 22, the support beam 3 is pivotably attached to a second end 62 of the neck member 6. Thus attached, the support beam 3 enables the user to adjust the orientation of the neck member 6. In the preferred embodiment of the present invention, the neck member 6 is a curved beam; thus shaped, to maintain the clamping mechanism 2 over the centerline of the attached guitar stand whenever a longitudinal axis 31 of the support beam 3 is parallel to a longitudinal axis of the attached guitar stand. Additionally, the first end 61 of the neck member 6 is positioned coincident with a longitudinal axis 31 of the support beam 3 so that the clamping mechanism 2 maintains the back panel 1 in an orientation facilitating viewing on the attached tablet computer. Furthermore, the second end 62 of the neck member 6 being positioned offset from the longitudinal axis 31 of the support beam 3. As a result, the second end 62 of the neck member maintains the weight of the clamping mechanism over the center line of the attached guitar stand. In a second alternative embodiment of the present invention, the neck member 6 is an angular beam. The curved beam and the angular beam are shaped in such a way that the weight of the present invention is positioned over the center of the attached guitar stand. In a third alternative embodiment, the fixed jaw 22 is pivotably connected to the neck member 6. Consequently, the user is able to further adjust the orientation of the clamping mechanism 2 and back panel 1.

In reference to FIG. 1 and FIG. 2, to attach the present invention to a guitar stand, the user makes use of the multi-position fastener 4, which is preferably a user-actuated clamp. To that end, the multi-position fastener 4 comprises a first bracing plate 41, an extension web 43, a second bracing plate 42, a clamping rod 44, and a rod hole 45. The first bracing plate 41 is a rigid panel that is used to brace against the attached guitar stand. The first bracing plate 41 is adjacently connected to the extension web 43. As a result, the extension web 43 is also a rigid beam that is used to connect the first bracing plate 41 to the second bracing plate 42. The second bracing plate 42 is a is a rigid panel that is adjacently connected to the extension web 43, opposite to the first bracing plate 41. Thus positioned, the second bracing plate 42 is used to hold the clamping rod 44 in a position which facilitates bracing the attached guitar stand against the first bracing plate 41. The rod hole 45 traverses through the second bracing plate 42, toward the first bracing plate 41. Accordingly, the clamping rod 44, which engages the rod hole 45, is able to brace the attached guitar stand against the first bracing plate 41.

Figure 9:
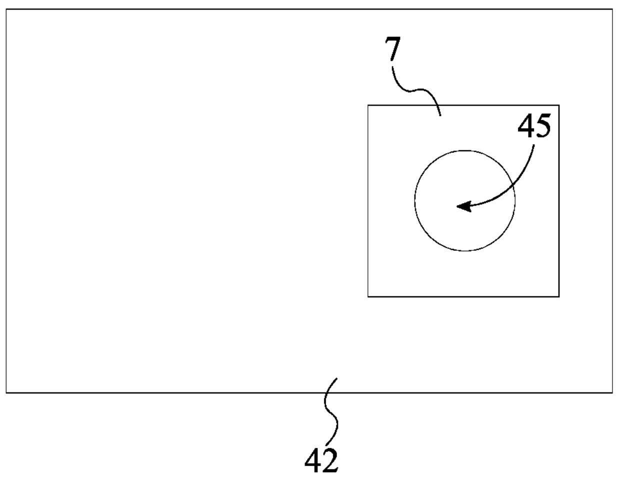
FIG. 9 is a front view of the second bracing plate used in the present invention.

In reference to FIG. 1 and FIG. 9, in the preferred embodiment of the present invention, the support beam 3 is adjacently connected to the second bracing plate 42, opposite to the first bracing plate 41. As a result, the orientation of the support beam 3 relative to the attached guitar stand is adjusted by adjusting the orientation of the multi-position fastener 4. Additionally, the rod hole 45 further traverses through the support beam 3. Accordingly, the clamping rod 44 may move through the rod hole 45 unimpeded.

While the preferred embodiment of the present invention is designed where the support beam 3 that is fixedly attached to the second bracing plate 42, a fourth alternative embodiment of the present invention further comprises a locking mechanism 7. Additionally, the support beam 3 is pivotably connected to the second bracing plate 42, opposite to the first bracing plate 41. Similarly, the rod hole 45 further traverses through the support beam 3 so that the clamping rod 44 forms an axis about which the support beam 3 and the second bracing plate 42 rotate. The locking mechanism 7 is a user-activated device that prevents the second bracing plate 42 and the support beam 3 from rotating about the clamping rod 44. To that end, the locking mechanism 7 is integrated into the pivoting connection between the support beam 3 and the second bracing plate 42. Consequently, the locking mechanism 7 does not impede the rotation of the support beam 3 relative to the second bracing plate 42 while the locking mechanism 7 is disengaged. In a fifth alternative embodiment, the multi-position fastener 4 is a rod that can be inserted into the neck of a guitar stand. In this embodiment, the multi-position fastener 4 can be held in a desired position by a lock pin. In a sixth alternative embodiment, a guitar yolk is attached to the multi-position fastener 4. This enables the present invention to be used as a guitar rest in addition to a music stand.

Figure 8:
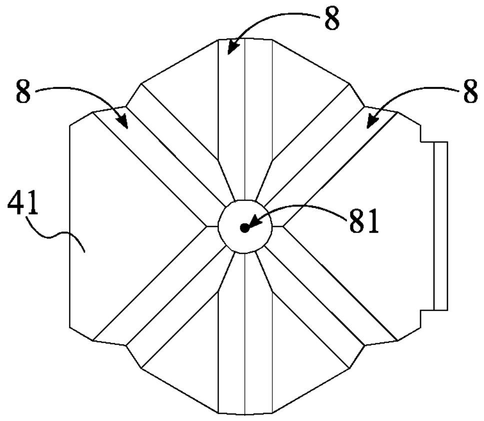
FIG. 8 is a front view of the first bracing plate used in the present invention.

In reference to FIG. 1 and FIG. 8, to facilitate maintaining the support beam 3 and locking mechanism 7 in a desired orientation, the present invention, comprises a plurality of position-orienting grooves 8. The plurality of position-orienting grooves 8 traverses into the first bracing plate 41. As a result, each of the plurality of position-orienting grooves 8 is able to function as a cradle for a lateral surface for the attached guitar stand. Additionally, each of the plurality of position-orienting grooves 8 is radially distributed about a center 81 of the first bracing plate 41. Thus positioned, each groove is able to hold the multi-position fastener 4 at a separate orientation relative to the longitudinal axis of the attached guitar stand. Furthermore, a first position-orienting groove is aligned with a longitudinal axis 31 of the support beam 3 so that the multi-position fastener 4 is able to maintain the longitudinal axis 31 of the support beam 3 in a parallel orientation relative to the longitudinal axis of the attached guitar stand.

In reference to FIG. 1 and FIG. 9, in the present invention, the rod hole 45 is preferably a female-threaded hole, and the clamping rod 44 is a male-threaded bolt. Additionally, the male threaded bolt engages the female threaded hole. Consequently, the user is able to move the clamping rod 44 through the rod hole 45 by rotating the clamping rod 44.

In reference to FIG. 1, the present invention further comprises at least one cushioned grip 9. The at least one cushioned grip 9 is a texturized material that is used to maintain the inserted tablet computer within the clamping mechanism 2 without damaging the inserted tablet computer. The at least one cushioned grip 9 is connected adjacent to the movable jaw 21. As a result, the at least one cushioned grip 9 prevents the movable jaw 21 from coming into direct contact with the fixed jaw 22. Furthermore, the at least one cushioned grip 9 is oriented toward the fixed jaw 22 to facilitate protecting the screen of the inserted tablet computer.

Although the invention has been explained in relation to its preferred embodiment, it is to be understood that many other possible modifications and variations can be made without departing from the spirit and scope of the invention as hereinafter claimed.

What is claimed is:

1. A mount for attaching electronic devices to a guitar stand comprising:
- a back panel;
- a clamping mechanism;
- a support beam;
- a multi-position fastener;
- the clamping mechanism comprising a movable jaw and a fixed jaw;
- the fixed jaw being adjacently connected to the back panel;
- the movable jaw being operatively coupled to the fixed jaw;
- the movable jaw being used to press against the fixed jaw;
- the fixed jaw being terminally mounted onto the support beam;
- the multi-position fastener being terminally mounted onto the support beam, opposite to the fixed jaw;
- a neck member;
- the fixed jaw being mounted to a first end of the neck member; and
- the support beam being pivotably attached to a second end of the neck member.

2. The mount for attaching electronic devices to a guitar stand as claimed in claim 1 comprising:
- the clamping mechanism comprising a handle, a fulcrum, and a spring;
- the handle being adjacently connected to the movable jaw;
- the handle being hingedly connected to the fixed jaw by the fulcrum; and
- the spring being operatively coupled between the movable jaw and the fixed jaw, wherein the spring is used to retract the movable jaw toward the fixed jaw.

3. The mount for attaching electronic devices to a guitar stand as claimed in claim 2 comprising:
- the spring being a torsion spring; and
- the torsion spring being mechanically connected with the fulcrum, wherein the torsion spring is used to resist rotation of the movable jaw away from the fixed jaw.

4. The mount for attaching electronic devices to a guitar stand as claimed in claim 2 comprising:
- the spring being a compression spring; and
- the compression spring being operatively coupled between the handle and the fixed jaw, wherein the compression spring is used to resist rotation of the movable jaw away from the fixed jaw.

5. The mount for attaching electronic devices to a guitar stand as claimed in claim 1 comprising:
- at least one page-stabilizing tab;
- the at least one page-stabilizing tab being adjacently connected to the movable; and
- the at least one page-stabilizing tab being positioned offset from the back panel.

6. The mount for attaching electronic devices to a guitar stand as claimed in claim 1 comprising:
- the neck member being a curved beam;
- the first end of the neck member being positioned coincident with a longitudinal axis of the support beam; and
- the second end of the neck member being positioned offset from the longitudinal axis of the support beam.

7. The mount for attaching electronic devices to a guitar stand as claimed in claim 1 comprising:
- the fixed jaw being pivotably connected to the neck member.

8. The mount for attaching electronic devices to a guitar stand as claimed in claim 1 comprising:
- the multi-position fastener comprising a first bracing plate, an extension web, a second bracing plate and a clamping rod;
- the first bracing plate being adjacently connected to the extension web;
- the second bracing plate being adjacently connected to the extension web, opposite to the first bracing plate;
- the second bracing plate comprising a first through hole traversing therethrough, toward the first bracing plate; and
- the clamping rod engaging the first through hole.

9. The mount for attaching electronic devices to a guitar stand as claimed in claim 8 comprising:
- the support beam being adjacently connected to the second bracing plate, opposite to the first bracing plate;
- the support beam comprising a second through hole traversing therethrough; and
- the first through hole and the second through hole corresponding to each other.

10. The mount for attaching electronic devices to a guitar stand as claimed in claim 8 comprising:
- a locking mechanism;
- the support beam being pivotably connected to the second bracing plate, opposite to the first bracing plate;
- the support beam comprising a second through hole traversing therethrough;
- the first through hole and the second through hole corresponding to each other; and
- the locking mechanism being integrated into the pivoting connection between the support beam and the second bracing plate.

11. The mount for attaching electronic devices to a guitar stand as claimed in claim 8 comprising:
a plurality of position-orienting grooves;
the plurality of position-orienting grooves traversing into the first bracing plate;
each of the position-orienting grooves being radially distributed about a center of the first bracing plate; and
a first position-orienting groove being aligned with a longitudinal axis of the support beam.

12. The mount for attaching electronic devices to a guitar stand as claimed in claim 8 comprising:
the first through hole being a female threaded hole;
the clamping rod being a male threaded bolt; and
the male threaded bolt engaging into the female threaded hole.

13. The mount for attaching electronic devices to a guitar stand as claimed in claim 1 comprising:
at least one cushioned grip;
the at least one cushioned grip being connected adjacent to the movable jaw; and
the at least one cushioned grip being oriented toward the fixed jaw.

14. A mount for attaching electronic devices to a guitar stand comprising:
a back panel;
a clamping mechanism;
a support beam;
a multi-position fastener;
at least one page-stabilizing tab;
a neck member;
at least one cushioned grip;
the clamping mechanism comprising a movable jaw, a fixed jaw, a handle, a fulcrum, and a spring;
the multi-position fastener comprising a first bracing plate, an extension web, a second bracing plate and a clamping rod;
the fixed jaw being adjacently connected to the back panel;
the movable jaw being operatively coupled to the fixed jaw, wherein the movable jaw is used to press against the fixed jaw;
the multi-position fastener being terminally mounted onto the support beam, opposite to the fixed jaw;
the handle being adjacently connected to the movable jaw;
the handle being hingedly connected to the fixed jaw by the fulcrum;
the spring being operatively coupled between the movable jaw and the fixed jaw;
the spring being used to retract the movable jaw toward the fixed jaw;
the at least one page-stabilizing tab being adjacently connected to the movable jaw;
the at least one page-stabilizing tab being positioned offset from the back panel;
the fixed jaw being mounted to a first end of the neck member;
the support beam being pivotably attached to a second end of the neck member;
the neck member being a curved beam;
the first end of the neck member being positioned coincident with a longitudinal axis of the support beam;
the second end of the neck member being positioned offset from the longitudinal axis of the support beam;
the first bracing plate being adjacently connected to the extension web;
the second bracing plate being adjacently connected to the extension web, opposite to the first bracing plate;
the second bracing plate comprising a first through hole traversing therethrough, toward the first bracing plate;
the clamping rod engaging the first through hole;
the support beam being adjacently connected to the second bracing plate, opposite to the first bracing plate;
the support beam comprising a second through hole traversing therethrough;
the first through hole and the second through hole corresponding to each other;
the at least one cushioned grip being connected adjacent to the movable jaw, and
the at least one cushioned grip being oriented toward the fixed jaw.

15. The mount for attaching electronic devices to a guitar stand as claimed in claim 14 comprising:
the spring being a torsion spring; and
the torsion spring being mechanically connected with the fulcrum, wherein the torsion spring is used to resist rotation of the movable jaw away from the fixed jaw.

16. The mount for attaching electronic devices to a guitar stand as claimed in claim 14 comprising:
the spring being a compression spring; and
the compression spring being operatively coupled between the handle and the fixed jaw, wherein the compression spring is used to resist rotation of the movable jaw away from the fixed jaw.

17. The mount for attaching electronic devices to a guitar stand as claimed in claim 14 comprising:
the fixed jaw being pivotably connected to the neck member.

18. The mount for attaching electronic devices to a guitar stand as claimed in claim 14 comprising:
a plurality of position-orienting grooves;
the plurality of position-orienting grooves traversing into the first bracing plate;
each of the position-orienting grooves being radially distributed about a center of the first bracing plate; and
a first position-orienting groove being aligned with a longitudinal axis of the support beam.

19. The mount for attaching electronic devices to a guitar stand as claimed in claim 14 comprising:
the first through hole being a female threaded hole;
the clamping rod being a male threaded bolt; and
the male threaded bolt engaging into the female threaded hole.

* * * * *